(12) United States Patent
Xu et al.

(10) Patent No.: US 11,087,011 B2
(45) Date of Patent: *Aug. 10, 2021

(54) DATA STORAGE DEVICE WITH SECURE ACCESS BASED ON TAP INPUTS

(71) Applicant: Western Digital Technologies, Inc., San Jose, CA (US)

(72) Inventors: Jun Xu, Singapore (SG); Lei Zhang, San Jose, CA (US); Wei Xi, Mission Viejo, CA (US); Dean Mitcham Jenkins, La Canada-Flintridge, CA (US); David W. Chew, San Juan Capistrano, CA (US); Jianguo Zhou, Foothill Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/649,553

(22) Filed: Jul. 13, 2017

(65) Prior Publication Data

US 2019/0018972 A1 Jan. 17, 2019

(51) Int. Cl.
| | | |
|---|---|---|
| *G06F 12/00* | (2006.01) | |
| *G06F 21/62* | (2013.01) | |
| *H04L 29/06* | (2006.01) | |
| *G06F 21/78* | (2013.01) | |
| *G06F 21/31* | (2013.01) | |
| *G06F 21/60* | (2013.01) | |
| *G06F 3/01* | (2006.01) | |
| *G06F 21/34* | (2013.01) | |

(52) U.S. Cl.
CPC .......... *G06F 21/6218* (2013.01); *G06F 21/31* (2013.01); *G06F 21/78* (2013.01); *H04L 63/0838* (2013.01); *G06F 3/01* (2013.01); *G06F 21/34* (2013.01); *G06F 21/602* (2013.01)

(58) Field of Classification Search
CPC ........ G06F 21/32; G06F 21/316; G06F 21/26; G06F 21/602; G06F 3/01; G06F 21/6218; H04W 12/06; H04L 63/0838; H04L 63/0861
See application file for complete search history.

(56) References Cited

U.S. PATENT DOCUMENTS

| | | | | |
|---|---|---|---|---|
| 6,580,574 B1 * | 6/2003 | Codilian | ................ | G11B 19/04 360/60 |
| 8,812,860 B1 | 8/2014 | Bray | | |
| 8,885,285 B1 * | 11/2014 | Nicholls | .............. | G11B 19/042 360/69 |
| 9,235,278 B1 * | 1/2016 | Cheng | ................... | G06F 3/0346 |

(Continued)

OTHER PUBLICATIONS

International Search Report and Written Opinion dated Aug. 29, 2018 for PCT/US2018/038627.

(Continued)

*Primary Examiner* — Arvind Talukdar
(74) *Attorney, Agent, or Firm* — Chang & Hale LLP

(57) ABSTRACT

Systems and methods are disclosed for providing secure access to a data storage device. A user may provide tap inputs, such as taps or knocks, on an enclosure of the data storage device. The data storage device may determine whether the tap inputs are valid and may allow access to the data storage device (e.g., to non-volatile memory of the data storage device) when the tap inputs are valid.

26 Claims, 10 Drawing Sheets

(56) References Cited

U.S. PATENT DOCUMENTS

| | | | |
|---|---|---|---|
| 9,696,859 B1* | 7/2017 | Heller | G06F 1/1686 |
| 2008/0136587 A1 | 6/2008 | Orr | |
| 2011/0080339 A1* | 4/2011 | Sun | G06F 3/017 |
| | | | 345/157 |
| 2013/0314208 A1 | 11/2013 | Risheq et al. | |
| 2014/0168057 A1* | 6/2014 | Ahuja | G06F 3/0346 |
| | | | 345/156 |
| 2016/0063230 A1* | 3/2016 | Alten | G06F 21/32 |
| | | | 726/28 |
| 2017/0083101 A1* | 3/2017 | Dow | G06F 3/017 |

OTHER PUBLICATIONS

International Search Report and Written Opinion dated Sep. 7, 2018 for PCT/US2018/038629, which shares a specification with the present application.

Co-pending U.S. Appl. No. 15/649,562 which shares the same disclosure as the present application, and all art cited therein now and in the future.

H. Ketabdar, Detecting Physical Shock by a Mobile Phone and its Applications in Security and Emergency, MobileHCI '09, No. 94, 2009.

H Ketabdar, J Qureshi, P Hui, Motion and audio analysis in mobile devices for remote monitoring of physical activities and user authentication, Journal of Location Based Services, V5(3-4), pp. 182-200, 2011.

International Written Opinion dated Jan. 14, 20202 for PCT/US2018/038627.

* cited by examiner

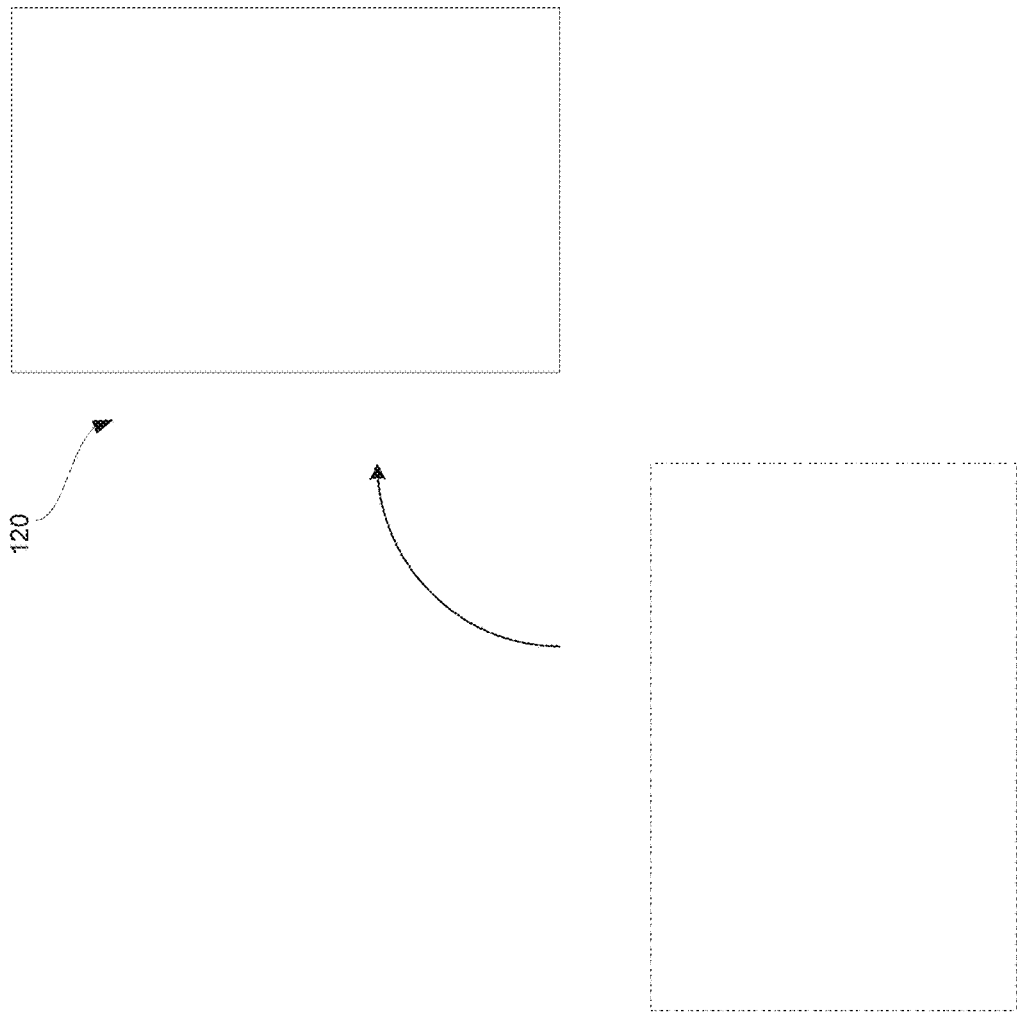

DATA STORAGE DEVICE WITH SECURE ACCESS BASED ON TAP INPUTS

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 5B is a diagram illustrating a data storage device, according to one or more embodiments.

DETAILED DESCRIPTION

Figure 1:
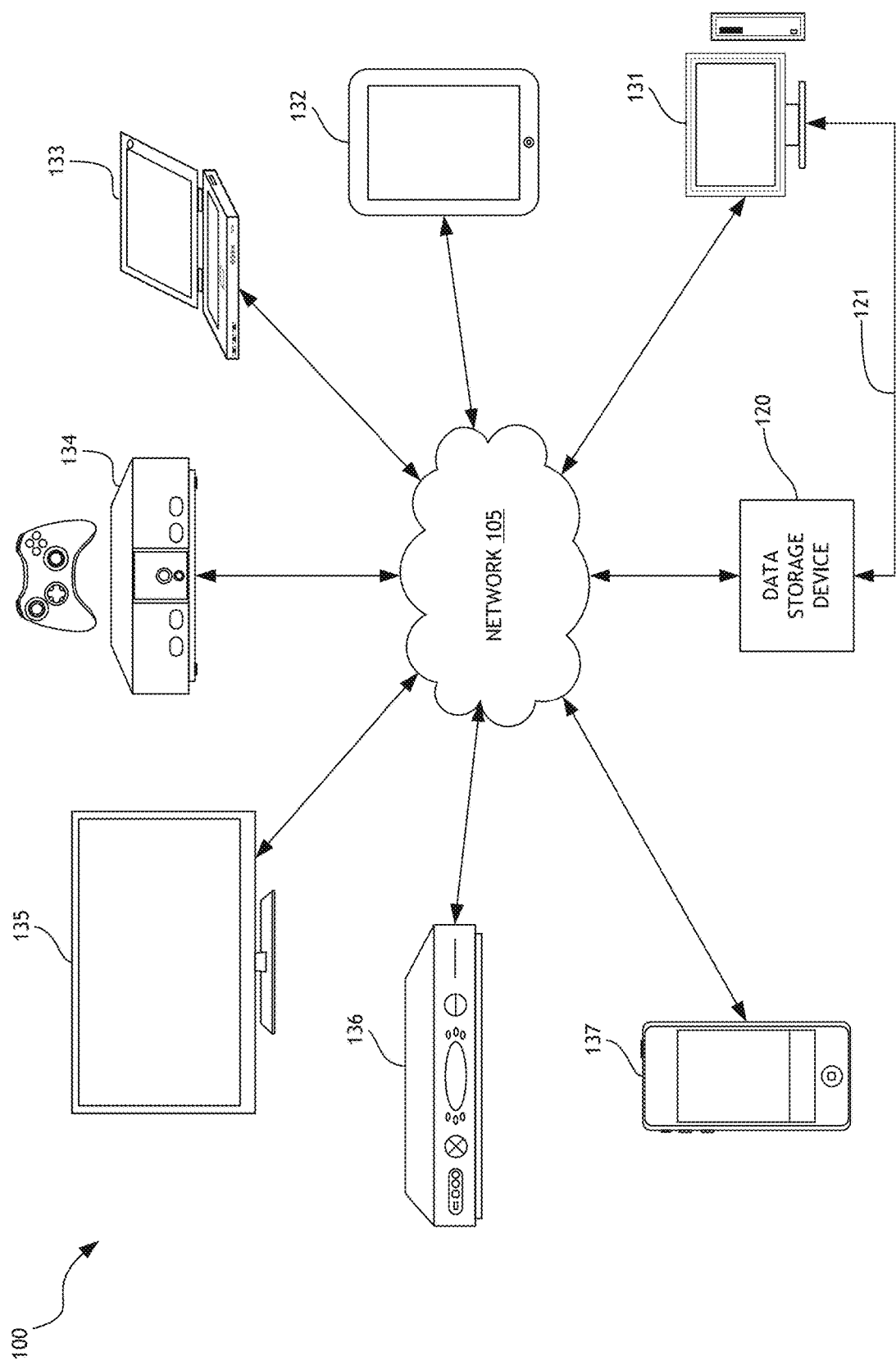
FIG. 1 is a diagram illustrating a data storage system, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to data storage devices with secure access.

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a direct-access interface (e.g., a communication interface such as USB 2.X, USB 3.X, Thunderbolt, eSATA, etc.) of the DAS device. A DAS device may provide a convenient mechanism for transferring data between computing devices, increasing the storage capacity (e.g., increase the storage space) of a computing device, and/or providing increased data security through data redundancy. Another example of a data storage device/system may be a NAS device. A NAS device may be coupled to a network via a network-access interface (e.g., a network interface or a communication interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability for providing secure access to a data storage device. The data storage device may include an enclosure/housing that encloses the components of the data storage device (e.g., non-volatile memory, a controller, one or more sensors, etc.). A user may provide tap input by tapping, knocking, etc., on the enclosure/housing and the tap inputs may be detected by one or more sensors of the data storage device. The data storage device may determine whether the tap inputs are valid and may allow access to the data storage device (e.g., to non-volatile memory of the data storage device) when the tap inputs are valid. The data storage device may also determine motions (e.g., movement) of the data storage device using the one or more sensors. The data storage device may determine whether the motions are valid and may allow access to the data storage device when the motions are valid.

Data Storage Devices

FIG. 1 is a diagram of a data storage system 100, according to an embodiment. In the data storage system 100, a data storage device 120 may be communicatively coupled to one or more client devices (e.g., computing devices) in order to provide file-based data storage services to the one or more client devices (e.g., one or more computing devices). Types of client devices (e.g., computing devices) that may have access to the data storage device 120 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices. In one embodiment, the data storage device 120 may be an external standalone data storage device. For example, the data storage device 120 may be a data storage device that is not located within a computing device (e.g., not within a case or housing of a computing device). In another example, the data storage device 120 may be a data storage device that may provide access to data without being directly coupled to a computing device (e.g., may be a NAS device). The client devices (e.g., computing devices) may also be referred to as host systems. In one embodiment, the data storage device 120 may be a portable data storage device. For example, the data storage device 120 may be a handheld device (e.g., a device that may be small enough to be held in hand of the user). In another example, the portable data storage device may receive power from the computing/client devices (e.g., host systems).

The data storage device 120 device may provide various client devices (e.g., phones 137, cable set-top boxes 136, smart TV's 135, video game consoles 134, laptop computers 133, tablet computers 132, desktop computers 131) with access to various types of user data stored on the data storage device 120. The data storage device 120 may also allow users to store various types of user data on the data storage device 120. The data storage device 120 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

With further reference to FIG. 1, the data storage device 120 (e.g., magnetic disk drive, hybrid hard drive, solid-state drive, etc.) may include a controller (not shown in FIG. 1) configured to receive data commands and to execute such commands in one or more non-volatile storage components of the data storage device 120. Such commands may include data read/write commands, and the like. The controller may be configured to receive data commands from a communication interface (e.g., a network-access interface and/or a direct-access interface) residing on a computing device (e.g., a host system). Data commands may specify a block address in the data storage device 120 and data may be accessed/transferred based on such commands. The data commands may also be referred to as data access requests.

The data storage device 120 may be configured to store data in one or more magnetic recording disks and/or the solid state memory devices/arrays. In an embodiment, the data storage device 120 may comprise a cable box, a backup disk drive, a media storage unit, a streaming media device, a digital camera, or any other electronic device which may store data that may need to be accessed directly or wirelessly.

In certain embodiments, the data storage device 120 may store data received from a client device such that the data storage device 120 acts as data storage for the client device. To facilitate this function, the data storage device 120 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 120. Mapping data indicating the mapping of logical addresses to physical memory addresses may be maintained in the data storage device 120.

In one embodiment, the data storage device 120 may be a DAS device. The DAS device may be directly coupled to client device (e.g., a desktop computer 131) via a connection cable 121. The connection cable 121 may be coupled to a communication interface (e.g., a USB 2.X interface, a USB 3.X interface, a Thunderbolt interface, etc.) of the DAS device (e.g., data storage device 120). In another embodiment, the data storage device 120 may also be a NAS device. The NAS device may also be coupled to the client devices 131-137 (e.g., computing devices) via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. Although FIG. 1 illustrates the data storage device 120 as being coupled to the client device 131, the data storage device may be coupled to any number of the client devices 131-137 via one or more connection cables in other embodiments.

In one embodiment, the data storage device 120 may receive data access requests from the client devices 131-137 via the communication interface (e.g., a direct-access interface such as USB 2.X, USB 3.X, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 120. In another example, a data access request may indicate that a computing device wants to write data to the data storage device 120.

Many data storage devices use a separate application (e.g., an app, software, etc.) that is installed on a computing device to provide secure access to the data storage devices. For example, a computing device may use an application (e.g., an unlocker/unlocking application) to encrypt/decrypt data on a data storage device that is coupled to the computing device. In another example, the computing device may use the application to allow/prevent access to data stored on the data storage device. The application may allow and/or prevent access to the data storage device based on a password provided by the user. Because the application is installed on the computing device, different versions of the application may be used for different operating systems. In addition, because an application is used to allow/prevent access to the data storage device, the data storage device may not be bootable (e.g., may not be used as a boot device). In addition, other data storage devices may use additional hardware such as fingerprint readers (to verify fingerprints of users), a camera (for facial recognition of users), a touch sensitive input device (e.g., a trackpad, an LCD screen, etc., for password input), etc., to validate/authenticate users. Using additional hardware to validate/authenticate users may increase the cost of the data storage device and may also increase the complexity of the data storage device.

It may be useful to provide a data storage device that is able to provide secure access to the data storage device (e.g., is able to encrypt/decrypt data, is able to allow/prevent access to data stored on the data storage device, etc.) without using an application (e.g., a separate application) installed on a computing device. This may allow the data storage device to be used with a wider variety of computing devices with different operating systems because the computing devices may not use an application to provide secure access to the data storage device. It may also be useful to provide secure access (e.g., authenticate/validate users) without using additional hardware. For example, it may be useful to provide secure access to a data storage device using sensor devices that may already be present in the data storage device for other purposes (e.g., shock/vibration sensors that are used to detect vibrations, accelerometers use to detect motion/speed/acceleration, gyroscopes that are used to detect orientation, etc.).

Data Storage Device with Secure Access

Figure 2:
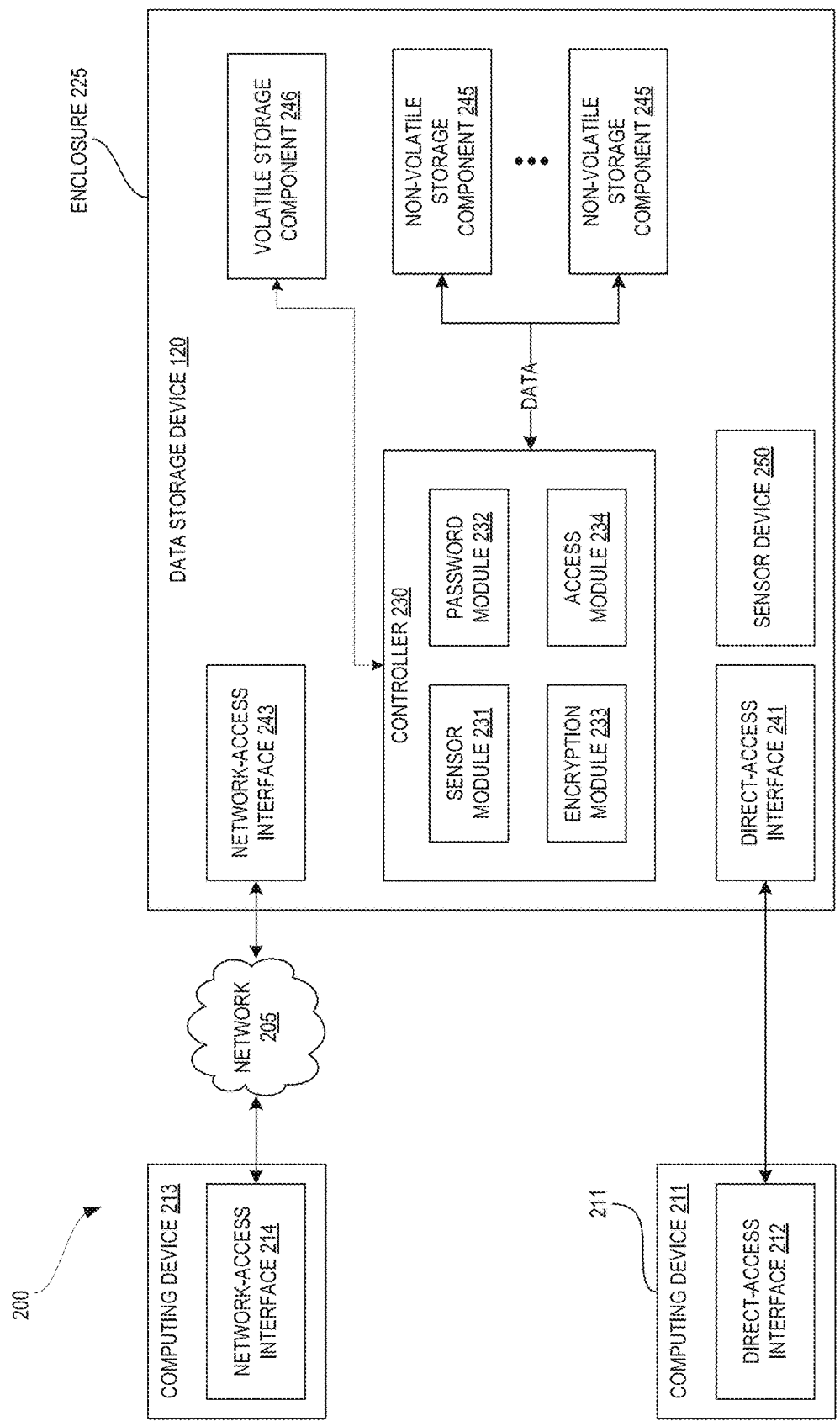
FIG. 2 is a diagram illustrating a data storage system, in accordance with one or more embodiments.

FIG. 2 is a diagram of a data storage system 200 according to an embodiment. The data storage system 200 includes a computing device 211, a computing device 213, a connection cable, and a data storage device 120. Each of the computing devices 211 and 213 may be a laptop computer, a desktop computer, a server computer, a tablet computer, a smart phone, a set-top box, a smart TV, a video game console, etc. The computing devices 211 and 213 may also be referred to as host systems. The data storage device 120 may include a controller 230, a direct-access interface 241 (e.g., USB 2.X, USB 3.X, Thunderbolt, eSATA, etc.), a network-access interface 243 (e.g., Ethernet, Wi-Fi, etc.), volatile storage component 246, and non-volatile storage components 245. In one embodiment, the non-volatile storage components 245 may include non-volatile magnetic media, and/or solid-state memory, such as NAND flash. The controller 230 may provide overall control for the data storage device 120. In one embodiment, the data storage device 120 may be a portable data storage device (e.g., a portable external hard drive). The controller 230 includes a sensor module 231, a password module 232, an encryption module 233, and an access module 234.

In certain embodiments, the data storage device 120 may be a hard disk drive. The non-volatile storage components 245 may include one or more disks and the data storage device 120 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 120 may be, for example, a hybrid hard drive including both magnetic media and solid-state media (e.g., the non-volatile storage components 245 may include both magnetic disks and solid state media/memory). In one embodiment, the non-volatile storage components 245 may be coupled to the controller via one or more serial bus connectors. Examples of serial bus connectors include, but are not limited to, serial ATA (SATA) connectors, peripheral component interconnect express (PCIe) connectors, and SATA Express connectors. In one embodiment, the data storage device 120 may be external standalone data storage devices (e.g., NAS devices/drives, portable external hard drives, etc.). In another embodiment, the data storage device 120 may be a portable data storage device. For example, the data storage device 120 may be a portable external hard drive. In one embodiment, data storage device 120 may receive power from the computing device 211 via a connection cable and the direct-access interfaces 212 and 241. For example, the data storage device 120 may operate using power (e.g., voltage, current, etc.) received from the computing device 211 (e.g., a host system) and/or may charge a battery (or other power source) using the power received from the computing device 211.

The volatile storage component 246 may include volatile memory. Volatile memory may be memory that requires power to maintain the data stored in the volatile memory. For example, data store in volatile memory may be lost if power is not supplied to the volatile memory. Examples of volatile memory may include, but are not limited to, random access memory (RAM), dynamic RAM, static RAM, dual in-line memory modules (DIMMs), etc. The volatile storage component 246 may be coupled to the controller via a bus (e.g., a data bus).

The controller 230 may receive data access requests (e.g., data and storage access commands) from a direct-access interface 212 (e.g., a USB interface, a Thunderbolt interface) of the computing device 211. Data access requests communicated by the direct-access interface 212 may include write and read commands issued by the computing device 211. The data access requests may specify a LBA, or range of LBAs, in the data storage device 120, and the controller 230 may execute the received data access requests in the non-volatile storage components 245. The controller 230 may also receive data access request from a network-access interface 214 (e.g., a communication interface such as an Ethernet interface, a Wi-Fi interface, etc.) of the computing device 213. The controller may determine an LBA and/or a range of LBAs in the data storage device 120 based on the data access requests and may execute the received data access requests in the non-volatile storage components 245. In a hybrid hard drive, data may be stored in a magnetic media storage component as well as non-volatile solid-state memory.

The data storage device 120 may store data received from the computing devices 211 and 213, such that the data storage device 120 acts as memory for the computing devices 211 and 213. To facilitate this memory function, the controller 230 may implement a logical interface. The logical interface may present to the computing devices 211 and 213 the memory of the data storage device 120 as a set of logical addresses (e.g., contiguous address) where data can be stored. The controller 230 may map logical addresses to various physical memory addresses in the non-volatile storage components 245 and/or other memory module(s).

The data storage device 120 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing devices 211 and 213 as a single drive. Data may be distributed across the RAID memory modules/drives according to any desirable or practical RAID level, depending on the level of redundancy and/or performance desired. For example, the data storage device 120 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 120 via a connection cable. The connection cable may directly connect the computing device 211 and the data storage device 120. The connection cable may use one or more communication interfaces (such as a bus interface) and/or protocols that may allow the computing device 211 to communicate with the data storage device 120. The direct-access interfaces 212 and 241 may be USB interfaces, Thunderbolt interfaces, serial attached SCSI (SAS), eSATA interface, etc.

In one embodiment, the connection cable may include one or more data lines (e.g., one or more wires, pins, etc.) that allow the computing device 211 to communicate data with the data storage device 120. For example, the connection cable may include data lines (not shown in FIG. 2) that the computing device 211 may use to read data from and/or write data to the data storage device 120. The computing device 211 may communicate data to and from the data storage device using the direct-access interface 212 (e.g., via the direct-access interface 212). In another embodiment, the computing device 211 may provide an input voltage to the data storage device 120 and the data storage device 120 may use the input voltage to operate one or more components of the data storage device 120 (e.g., the controller 230, the non-volatile storage components 245, a motor, etc.). The connection cable may include one or more voltage lines (e.g., wires, pins, etc.) that may receive the input voltage from the computing device 211 via the direct-access interface 212. The one or more voltage lines may provide the input voltage (received from the computing device 211) to the data storage device 120 via the direct-access interface 241. In a further embodiment, the data storage device 120 may be coupled to a separate power source (e.g., may be coupled to a battery, to an AC adaptor, to a wall outlet, etc.).

In one embodiment, the connection cable may include a bridge unit (not shown in FIG. 2). For example, the connection cable may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 120 via a network 205 (e.g., one or more of a Wi-Fi network, a LAN, a cellular network, etc.). The computing device 213 may send data (e.g., files, images, movies, etc.) and/or data access requests to the data storage device 120 via the network-access interface 214 (e.g., a communication interface an Ethernet interface, a Wi-Fi interface, etc.) and the network 205. The data storage device 120 may receive the data and/or data access requests from the computing device 213 via the network-access interface 243.

The data storage device 120 includes an enclosure 225 (e.g., a housing, a case, a cover, etc.) that may enclose/house the various components of the data storage device 120. For example, the network-access interface 243, the controller 230, the direct-access interface 241, the sensor device 250, and the non-volatile storage components 245 may be located within the enclosure 255. The enclosure 225 may be made of various materials including, but not limited to, plastic, thermoplastic, metal, metallic alloys, polymers, etc. The enclosure 225 may be various shapes and/or sizes in different embodiments. For example, the enclosure 225 may be shaped like a flat rectangular prism with round corners.

As illustrated in FIG. 2, the data storage device 120 includes a sensor device 250. Examples of sensor devices may include, but are not limited to, a shock sensor (e.g., a 3-dimensional (3D) shock sensor), a vibration sensor (e.g., a rotary acceleration feed forward (RAFF)), a gyroscope, an accelerometer, a compass (e.g., a magnetometer), a temperature sensor (e.g., a thermometer), a global positioning system (GPS) sensor, etc. One having ordinary skill in the art understands that in other embodiments, the data storage device 120 may include multiple sensor devices (e.g., multiple vibration sensors) and/or multiple types of sensor devices (e.g., a gyroscope and a vibration sensor).

In one embodiment, the sensor device 250 may be an existing sensor in the data storage device 120. For example, the data storage device 120 may include vibration/shock sensors to detect vibrations (e.g., impacts) of the data storage device and to prevent damage to the data storage device (e.g., by moving heads of a hard disk to a safe position/configuration when an impact is detected). In another example, the data storage device 120 may include an accelerometer to detect when the data storage device 120 is accelerating (e.g., falling to the ground) and to prevent damage to the data storage device (e.g., by moving heads of a hard disk to a safe position/configuration when a fall is detected).

In one embodiment, the sensor device 250 may detect one or more tap inputs (e.g., taps, knocks, etc.) on the enclosure 225 (e.g., on a surface of the enclosure 225). For example, the sensor device 250 may be a vibration sensor that may detect when a user taps a surface (e.g., an upper/top surface) of the enclosure 225 with a finger, a knuckle, an object (e.g., the tip of a pen), etc. The sensor device 250 may transmit data to the controller 230 indicating that tap inputs were detected. For example, the sensor device 250 may transmit data to the controller 230 each time a tap input is detected. In one embodiment, the data (transmitted) by the sensor device 250 may also indicate the pressure, force, strength, magnitude, etc., of the tap inputs that are detected, as discussed in more detail below. For example, the data may indicate how hard a user tapped the surface of the enclosure 225 (e.g., the force of a tap). The pressure, force, strength, magnitude, etc., may be examples of the amplitude of the tap input. In another embodiment, the sensor device 250 may indicate the timing pattern (e.g., a rhythm) of multiple tap inputs (e.g., a timing between multiple tap inputs). For example, data may indicate that three tap inputs were received, with 1 second of time elapsing/passing between the first tap input and the second tap input, and with 2 seconds of time elapsing/passing between the second tap input and the third tap input. The timing pattern may be an example of the frequency of the tap inputs.

In one embodiment, the sensor device 250 may also detect one or more temperatures. For example, the sensor device 250 may detect the room temperature (e.g., ambient temperature) of a room where the data storage device is located. In another example, the sensor device 250 may detect the temperature at a location of the data storage device 120. For example, the sensor device 250 may detect the temperature of upper left corner of the enclosure 225. A user may increase the temperature of the upper left corner of the enclosure 225 by breathing/blowing on that location. The increase in temperature may be detected by the sensor device 250.

In another embodiment, the sensor device 250 may detect one or more motions of the data storage device 120. As discussed above, the data storage device 120 may be a handheld device. The user may change the orientation of the data storage device. For example, the user may twist the data storage device about an X-axis of the data storage device, a Y-axis of the data storage device, and/or a Z-axis of the data storage device. The user may also wave or move the data storage device 120 through a 3-dimensional (3-D) space/area (e.g., may wave/move the data storage device 120 around in the air). For example, the user may swing the data storage device 120 from left to right and vice versa. In another example, the user may swing the data storage device 120 up and down, and vice versa. In a further example, the user may move the data storage device 120 to form a pattern/shape (e.g., to form a rectangle shape, to form a figure eight pattern, etc.). In one embodiment, the controller 230 may move components of the data storage device 120 into a safe position/configuration when waiting for the user to provide/perform the set of motions. For example, if the non-volatile storage components 245 are hard disks, the controller 230 may park the heads of the hard disk to prevent damage to the platters/plates of the hard disks.

In one embodiment, the sensor device 250 may detect the speed/velocity of a motion/movement. For example, the user may swing the data storage device 120 to the left and the sensor device 250 may detect the speed of the swing. The sensor device 250 may also detect the acceleration of the motion/movement. The speed, velocity, and/or acceleration of the motions/movement may be examples of the amplitude of the motion/movement. The timing pattern of the motions/movements may be an example of the frequency of the motions/movements.

In one embodiment, sensor device 250 may detect an orientation and/or a position of the data storage device 120. For example, sensor device 250 may be a compass which may detect whether a face of data storage device 120 (e.g., the front face, the back face, etc.) is pointed in a direction (e.g., is pointed north, south, east, west, etc.). In another example, the sensor device 250 may determine whether the data storage device 120 is right side up, upside down, or on its side.

In another embodiment, the sensor device 250 may detect a geographical location of the data storage device 120. For example, the sensor device 250 may detect GPS signals. The sensor device 250 may determine the GPS coordinates (e.g., a physical location, a geographical location) of the data storage device 120 (based on the GPS signals) or may provide GPS data (e.g., data about the GPS signals) to the controller 230 and the controller 230 may determine the GPS coordinates based on the GPS data.

In some embodiments, the sensor device 250 may detect noise when detecting tap inputs and/or motions of the data storage device 120. For example, the sensor device 250 may detect errant vibrations (e.g., vibrations that may result when a user taps on a table where the data storage device 120 is placed). In another example, the sensor device may detect errant motions (e.g., motion that results when the user accidentally bumps into the data storage device 120). The sensor device 250 and/or the controller 230 may filter out the noises detected by the sensor device 250. For example, the sensor device 250 and/or the controller 230 may disregard signals/data that are below a threshold value.

In one embodiment, the access module 234 may determine whether a set of tap inputs received from a user are valid. For example, the sensor device 240 may detect a set of tap inputs (e.g., one or more taps on a surface of the enclosure 225) and the access module 234 (and/or controller 230) may determine whether the one or more tap inputs are valid, as discussed in more detail below. In another embodiment, the access module 234 may determine whether a set of motions of the data storage device 120 are valid. For example, the sensor device 250 may detect one or more motions of the data storage device 120 (e.g., one or more changes in orientation, one or more swings of the data storage device 120) and the access module 234 (and/or controller 230) may determine whether the one or more motions are valid.

In one embodiment, the access module 234 may allow access to the data storage device 120 (e.g., allow access to the non-volatile storage components 245) if the set of tap inputs is valid, as discussed in more detail below. For example, the access module 234 may allow the computing device 211 to read data from and/or write data to the non-volatile storage components 245 if the set of tap inputs is valid. In another example, the data storage device 120 may allow data to be written to and/or read from the non-volatile storage components via the direct-access interface 241 and/or the network-access interface 243 when the tap inputs are valid. In another embodiment, the access module 234 may allow access to the data storage device 120 if the set of motions is valid. For example, the access module 234 may allow the computing device 211 to read data from and/or write data to the non-volatile storage components 245 if the set of motions is valid.

In one embodiment, the access module 234 (and/or controller 230) may prevent access to the data storage device 120 (e.g., prevent access to the non-volatile storage components 245) if the set of tap inputs is invalid, as discussed in more detail below. For example, the access module 234 may refrain from decrypting data stored on the non-volatile storage components 245 if the set of tap inputs is invalid. In another embodiment, the access module 234 (and/or controller 230) may prevent access to the data storage device 120 if the set of motions is invalid, as discussed in more detail below. For example, the access module 234 may not allow data to be communicated via the network-access interface 243 and/or the direct-access interface 241.

In one embodiment, the access module 234 (and/or controller 230) may determine a number of access attempts to the data storage device 120. For example, the access module 234 may track the number of times that invalid tap inputs and/or invalid motions have been detected, using a counter. The controller 230 may increment the counter (or some other data indicating the number of times invalid tap inputs and/or invalid motions have been received) each time invalid tap inputs and/or invalid motions are received. In one embodiment, the access module 234 may delete at least a portion of the data stored on the non-volatile storage components 245 when the number of access attempts exceeds a threshold (e.g., if the counter exceeds a threshold). In another embodiment, the access module 234 may encrypt at least a portion of the data stored on the non-volatile storage components 245 when the number of access attempts exceeds a threshold.

In some embodiments, the access module 234 may reset the counter after a period of time has passed. For example, the access module 234 may reset the counter after one minute, ten minutes, one hour, one day, etc. In another example, the counter may be reset when valid tap inputs and/or valid motions are detected. In a further embodiment, the controller 230 may pause for an amount of time before tap inputs and/or motions may be provided each time invalid tap/swipe inputs are received. For example, if invalid tap inputs and/or invalid motions are detected, the controller 230 may not process/analyze additional motions/tap inputs until a period of time has passed (e.g., 5 seconds, 10 seconds, etc.). In another example, the controller 230 may not process/analyze additional motions/tap inputs until the data storage device 120 is reset (e.g., restarted, rebooted, powered off and then powered on, etc.).

The access module 234 may also perform additional authentication before providing/allowing access to the non-volatile storage components 245. For example, the access module 234 may determine whether pressures of the tap inputs are valid, whether the data storage device 120 is in a particular geographical location, whether the speeds of the motions are valid, etc., before providing/allowing access to the non-volatile storage components 245.

In one embodiment, the password module 232 may generate a one-time password (OTP) that may be used to perform additional validation/authentication before allowing access to the data storage device. For example, the password module 232 may generate an OTP that indicates a second set of taps (at a second set of locations and/or with a second timing pattern) that should be performed by the user. In another example, the password module 232 may generate an OTP that indicates a second set of motions that should be performed by the user. In one embodiment, the password module 232 may generate a time-based OTP. A time-based OTP may be a password that changes every period of time (e.g., changes every 30 seconds, every minute, every hour, etc.). In another embodiment, the password module 232 may generate a keyed-hash message authentication code (HMAC) based OTP. The HMAC OTP may use a cryptographic hash function and a cryptographic key to generate the OTP. One having ordinary skill in the art understands that in other embodiments, various algorithms, functions, operations, formulas, equations, etc., may be used to generate OTPs.

In one embodiment, the access module 234 may determine whether a second set of motions and/or a second set of tap inputs is valid based on the OTP generated by the password module 232. For example, the access module 234 may determine whether a second set of tap inputs matches the taps indicated by the OTP (e.g., whether the locations, pressures, and/or timing pattern of the set of tap inputs matches the OTP). In another example, the access module 234 may determine whether a second set of motions matches motions indicated by the OTP (e.g., whether the second set of motions, speeds, and/or timing pattern of the second set of motions matches the OTP). If the second set of tap inputs and/or second set of motions is valid, the access module 234 may allow access to the non-volatile storage components 245, as discussed above. If the second set of tap inputs and/or second set of motions is not valid, the access module 234 may not allow access to the non-volatile storage components 245, as discussed above.

In one embodiment, the access module 234 may determine whether a second set of motions and/or a second set of tap inputs, which are detected by another device, is valid. For example, the access module 234 may receive a message (and/or other data) from another device (e.g., a smartphone, a table computer, another data storage device, etc.) indicating the second set of motions and/or the second set of tap inputs that are detected by the other device. For example, the message may indicate the locations, pressures, and/or timing patterns of the second set of tap inputs. In another example, the data may indicate the motions, speeds, and/or timing patterns of the second set of motions. In one embodiment, the data storage device 120 may synchronize the timing for detecting the tap inputs and/or motions with the other device. For example, the data storage device 120 and the other device may each detect tap inputs and/or motions at the same time. In another example, the data storage device 120 may detect tap inputs and/or motions followed by the other device, or vice versa. The data storage device 120 may synchronize the timing with the other device by transmitting/exchanging one or more message to indicate when each respective device should detect tap inputs and/or motions. In one embodiment, a user may initiate the synchronization of the data storage device 120 and the other device. For example, the user may push a button on the data storage device 120 (and the other device) to initiate the synchronization. In another example, the user may use an application on the computing device 211 and/or computing device 213 to initiate the synchronization.

The access module 234 may determine whether a second set of motions and/or a second set of tap inputs is valid. For example, the access module 234 may determine whether a second set of tap inputs matches the first set of tap inputs (e.g., whether the taps are at the same locations, have the same pressure, and/or have the same timing pattern). In another example, the access module 234 may determine whether a second set of motions matches the first set of motions (e.g., whether the motions, speeds, and/or timing pattern of the second set of motions are the same as the first set of motions). If the second set of tap inputs and/or second set of motions (received from the other device) is valid, the access module 234 may allow access to the non-volatile storage components 245, as discussed above. If the second set of tap inputs and/or second set of motions (received from the other device) is not valid, the access module 234 may not allow access to the non-volatile storage components 245, as discussed above.

As discussed above, the sensor devices 250 may determine the orientation/position of the data storage device 120. The access module 234 may allow access to the non-volatile storage components 245 further based on the orientation/position of the data storage device 120. For example, the controller 230 may allow access to the non-volatile storage components 245 when the front face of the data storage device 120 is pointed north and when the tap inputs detected on the enclosure 225 are valid. The access module 234 may also prevent access to the non-volatile storage components 245 further based on the orientation/position of the data storage device 120. For example, the access module 234 may prevent access to the non-volatile storage components 245 if the motions of the data storage device 120 are invalid and/or if the data storage device 120 is not in a particular orientation.

As discussed above, the sensor device 250 may detect the geographical location of the data storage device 120 (e.g., may determine GPS coordinates, a geographical locations, etc.) The access module 234 may allow access to the non-volatile storage components 245 further based on the geographical location of the data storage device 120. For example, the access module 234 may allow access to the non-volatile storage components 245 when the GPS coordinates indicate that the data storage device 120 is located in a user's home and when the motions (of the data storage device 120) detected by the sensor device 250 are valid. The access module 234 may also prevent access to the non-volatile storage components 245 further based on the geographical location of the data storage device 120. For example, the access module 234 may prevent access to the non-volatile storage components 245 if the tap inputs detected by the sensor device 250 are invalid and/or if the data storage device 120 is not in a particular geographical location.

As discussed above, the sensor device 250 may detect the pressure, force, strength, magnitude, etc., of the tap inputs on the enclosure 225. For example, the access module 234 may allow access to the non-volatile storage components 245 when a set of tap inputs is valid and the pressures of the set of tap inputs are also valid, as discussed in more detail below. The controller 230 may also prevent access to the non-volatile storage components 245 further based on pressures of the tap inputs detected by the sensor device 250. For example, the controller 230 may prevent access to the non-volatile storage components 245 if the tap inputs are invalid and/or if one or more of the pressures of the taps inputs are invalid, as discussed in more detail below.

In one embodiment, the sensor device 250 may detect multiple sets of tap inputs and/or multiple sets of motions of the data storage device (e.g., multiple sets of tap inputs and/or swipe inputs). The multiple sets of tap inputs and/or multiple sets of motions may be associated with different users of the data storage device 120. For example, a first set of tap inputs may be associated with a first user and a second set of tap inputs may be associated with a second user. The access module 234 may allow (e.g., grant) the first user access to the non-volatile storage components 245 when the first set of tap inputs are valid and may allow the second user access to the non-volatile storage components 245 when the second set of tap inputs are valid.

In another embodiment, the access module 234 may allow access to different portions of the non-volatile storage components 245 based on the different sets of tap inputs and/or sets of motions (of the data storage device 120). For example, the controller 230 may grant access to a first portion of the non-volatile storage components 245 (e.g., a first set of files and/or folders, a first partition of the data storage device 120, etc.) when the first set of motions are valid and may grant access to a second portion of the non-volatile storage components 245 (e.g., a second set of files and/or folders, a second partition of the data storage device 120, etc.) when the second set of motions are valid.

In one embodiment, the data storage device 120 may include an encryption module 233 that may encrypt/decrypt data (e.g., blocks, pages, files, etc.) stored on the non-volatile storage components 245. For example, the encryption module 233 may decrypt/encrypt data based on determinations (made by the access module 234) of whether motions/tap inputs detected by the sensor device 250 are valid. The encryption module (not illustrated in FIG. 2) may use encryption keys and/or encryption functions/algorithms to encrypt and/or decrypt data. One having ordinary skill in the art understands that the encryption module 233 may user various algorithms, functions, formulas, operations, etc., to encrypt and/or decrypt data. For example, the encryption module 233 may use advanced encryption standard (AES) algorithm to encrypt/decrypt data. In another example, the encryption module 233 may use the Blowfish algorithm to encrypt/decrypt data.

In some embodiments, granting and/or preventing access to the data storage device 120 based on tap inputs (on a surface of the enclosure 225) and/or motions of the data storage device 120 may allow the data storage device 120 to be used with a wider variety of computing devices with different operating systems because the computing devices do not need an application (e.g., an unlocker application) to provide secure access to the data storage device 120. This may also allow the data storage device 120 to be bootable while still providing secure access to the data storage device 120. In addition, data storage device 120 may be more secure because the motions/taps (e.g., the password) is not transmitted to the data storage device 120 via a communication interface (e.g. via a DAS interface or a network-access interface), but rather, are detected by the sensor device 250 of the data storage device 120. The tap inputs and motions may also allow the user to provide a stronger password as compared to a standard alphanumeric password.

As discussed above, the controller 230 may receive data access requests (e.g., data and storage access commands) via network-access interface 243 and/or direct-access interface 243. The access requests may include requests to read and/or write data to the volatile storage component 246. For example, the access requests may be direct memory access (DMA) requests or remote DMA (RDMA) requests. In some embodiments, the controller may allow, grant, prevent, deny, etc., users access to the based on the tap inputs and/or motions of the data storage device 120, similar to the examples, implementations, and embodiments discussed above in conjunction with the non-volatile storage components 245.

Providing Secure Access

Figure 3:
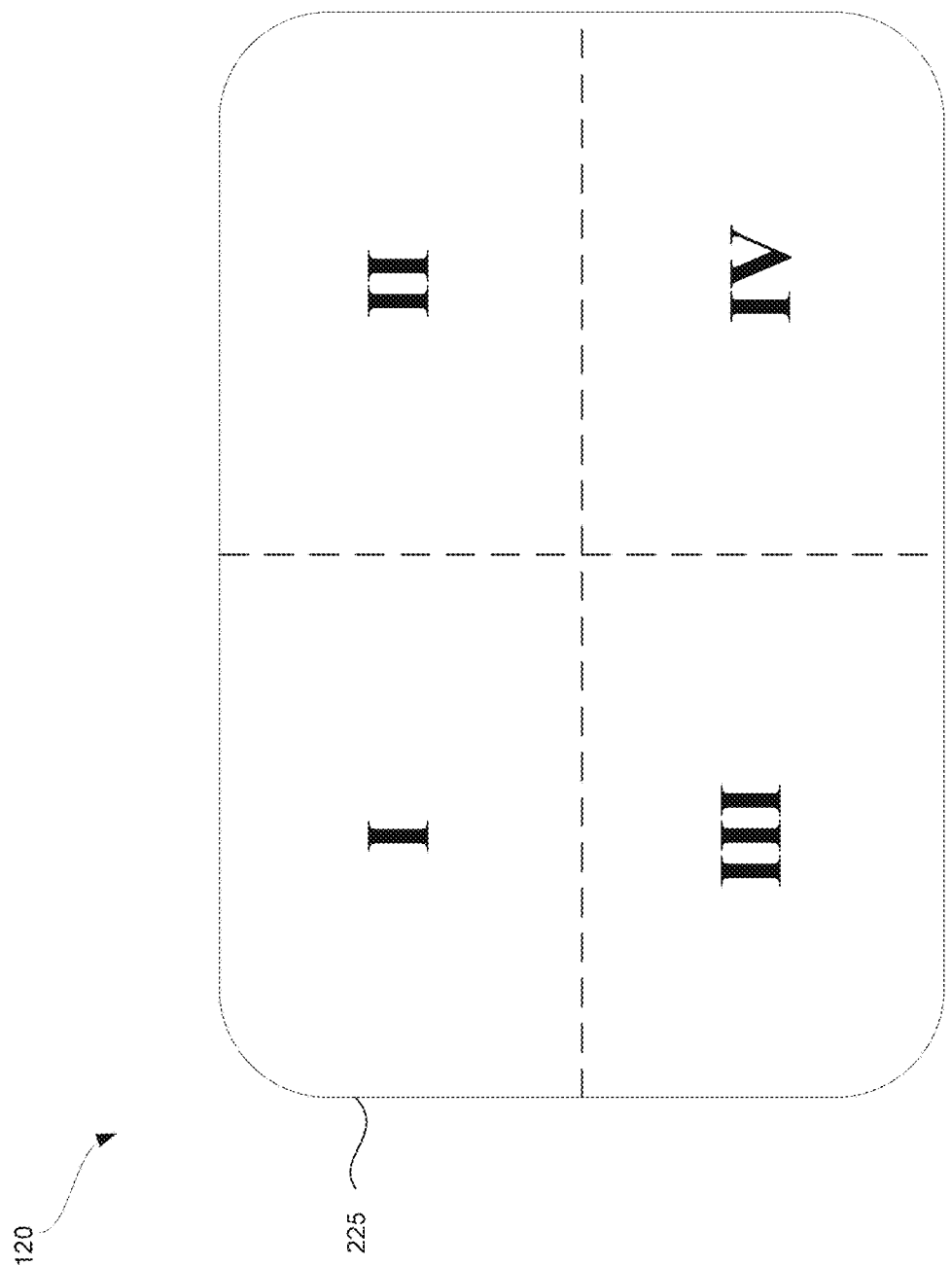
FIG. 3 is a diagram illustrating a data storage device, in accordance with one or more embodiments.

FIG. 3 is a diagram illustrating an overhead view of a data storage device 120, according to an embodiment. The data storage device 120 includes a controller (not illustrated in FIG. 3), a network access interface (e not illustrated in FIG. 3), a direct access interface (not illustrated in FIG. 3), non-volatile storage components (not illustrated in FIG. 3), one or more sensor devices (not illustrated in FIG. 3), and an enclosure 225 (e.g., a housing, a casing, etc.), as discussed above. The controller may provide overall control for the data storage device 120, as discussed above. In one embodiment, the data storage device 120 may be an external standalone data storage device (e.g., a NAS device/drive, a DAS device/drive, etc.). In another embodiment, the data storage device 120 may be a portable data storage device. For example, the data storage device 120 may be a portable external hard drive. The portable external hard drive may receive power from a computing device (e.g., a host system) via a connection cable and the direct-access interface 341. The portable external hard drive may also have an internal power source (e.g., a battery located within the enclosures 225), as discussed above. As discussed above, the data storage device (e.g., the controller) may determine whether a set of tap inputs (detected by one or more sensor devices) are valid and may allow access to the data storage device (e.g., to non-volatile memory of the data storage device) when the tap inputs are valid.

In one embodiment, the data storage device may determine whether the set of tap inputs are valid by determining whether the set of tap inputs are at a set of locations (e.g., are at a set of valid locations) on the enclosure 225. As illustrated in FIG. 3, surface of the enclosure 225 (e.g., an upper/top surface of the enclosure 225 when the data storage device 120 is laid flat on a surface) is divided into four quadrants: quadrant I, quadrant II, quadrant III and quadrant IV. The data storage device may determine whether the set of tap inputs (detected by the one or more sensor devices) are in a pattern (e.g., an order) of locations on the surface of the enclosure 225. For example, a valid set of tap inputs (e.g., a password) may be a follows: 1) a tap in quadrant I; 2) followed by a tap in quadrant I; 3) followed by a tap in quadrant III; 4) followed by a tap in quadrant IV; 5) followed by a tap in quadrant II; and 6) followed by a tap in quadrant II. The data storage device may determine whether a set of tap inputs provided by the user (and detected by the one or more sensor devices) matches the valid set of tap inputs (e.g., whether the set of tap inputs is valid or matches the password).

In some embodiments, the tap inputs may be detected on multiple surfaces of the enclosure 225. For example, a valid set of taps may include taps in locations on the top/upper surface of the enclosure 255 and taps in locations on the lower/bottom surface of the enclosure 255.

One having ordinary skill in the art understands that the number of locations on the surface of the enclosure may be different in other embodiments. For example, the surface of the enclosure 225 may be divided into eight, ten, sixteen, etc., areas/locations. One having ordinary skill in the art also understands that the shapes of the areas/locations on the surface of the enclosure 225 may vary in other embodiments. For example, the surface of the enclosure 255 may be divided into sectors (similar to sectors of a circle).

Figure 4A:
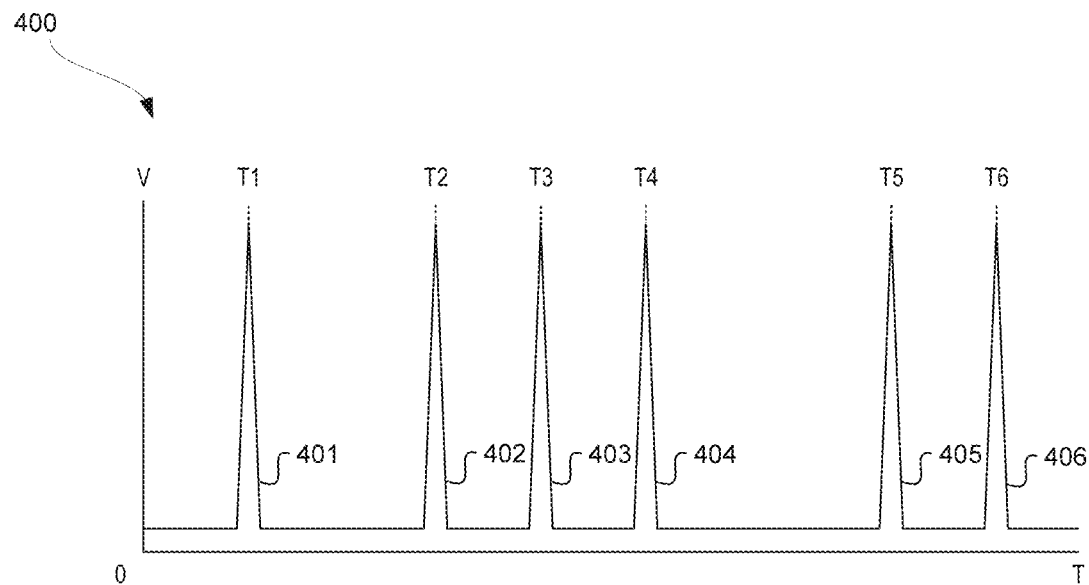
FIG. 4A is a graph illustrating tap inputs that may be detected by one or more sensors of a data storage device, in accordance with one or more embodiments.

FIG. 4A is a graph 400 illustrating tap inputs that may be detected by one or more sensors of a data storage device, in accordance with one or more embodiments. As discussed above, one or more sensor devices of the data storage device may detect a set of tap inputs (e.g., taps, knocks, etc.) on a surface of an enclosure (e.g., housing) of the data storage device. The data storage device (e.g., the controller) may determine whether the set of tap inputs (detected by one or more sensor devices) are valid and may allow access to the data storage device (e.g., to non-volatile memory of the data storage device) when the tap inputs are valid.

Graph 400 may illustrate the data collected by the one or more sensors of the data storage device over a period of time. The X-axis of the graph represents time going from time 0 to T. The Y-axis of the graph may represents the amount of vibration detected by the one or more sensors. For example, the Y-axis of the graph may indicate the magnitude, pressure, force, etc., of a tap input. The amount of vibration may range from 0 to V. As illustrated in FIG. 4A, the data (e.g., sensor data collected by the one or more sensors) indicates that six taps (e.g., taps 401, 402, 403, 404, 405, and 406) were detected on the surface of the enclosure. Tap 401 was detected at time T1, tap 402 was detected at time T2, tap 403 was detected at time T3, tap 404 was detected at time T4, tap 405 was detected at time T5, and tap 406 was detected at time T6.

In one embodiment, the data storage device may determine whether a timing pattern of the taps is valid. For example, there is a long pause in time between time T1 and T2 and there is a shorter pause in time between time T2 and T3. The timing pattern of the taps may be as follows: a long pause (between tap T1 and T2), followed by a short pause (between tap T2 and T3), followed by a short pause (between tap T3 and T4), followed by a long pause (between tap T4 and T5), followed by a short pause (between tap T5 and T6). If the timing pattern of the taps match a timing pattern previously provided by the user (e.g., a password that includes tap inputs and/or a timing pattern for the tap inputs), the data storage device may allow access to the non-volatile storage components of the data storage device. For example, if the timing pattern previously provided by the user (e.g., the password) was as [long, short, short, long, short], this would match the timing pattern illustrated in FIG. 4A (e.g., the timing pattern would be valid) and the user would be allowed to access the non-volatile storage components of the data storage device. If the timing pattern of the taps do not match a timing pattern previously provided by the user (e.g., a password that includes tap inputs and/or a timing pattern for the tap inputs), the data storage device may refrain from allowing and/or may prevent access to the non-volatile storage components of the data storage device. For example, if the timing pattern previously provided by the user (e.g., the password) was as [long, short, long, long, short], this would not match the timing pattern illustrated in FIG. 4A (e.g., the timing pattern would be invalid) and the user would not be allowed to access the non-volatile storage components of the data storage device.

Figure 4B:
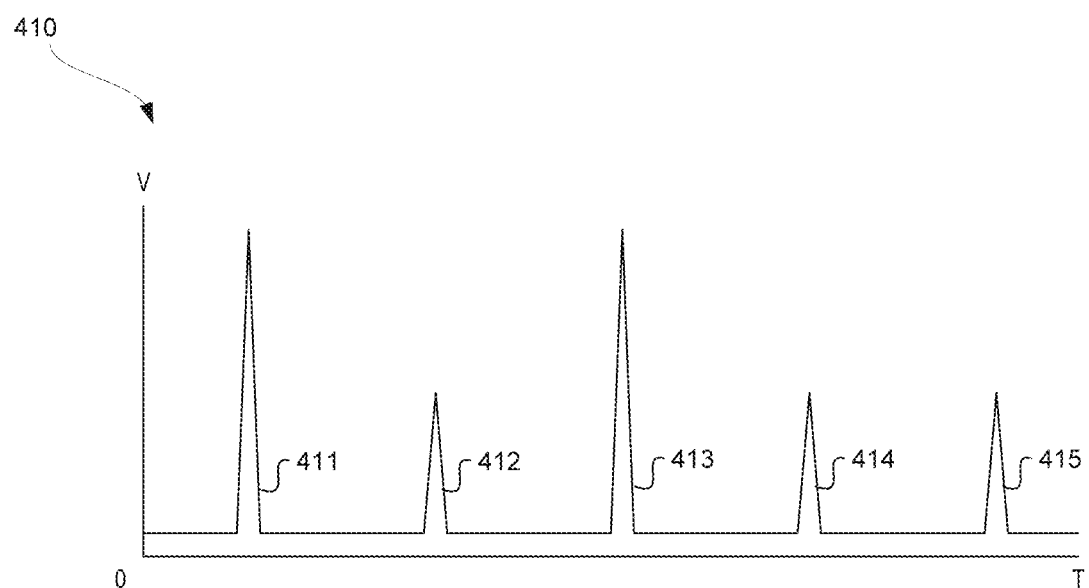
FIG. 4B is a graph illustrating tap inputs that may be detected by one or more sensors of a data storage device, in accordance with one or more embodiments.

FIG. 4B is a graph 410 illustrating tap inputs that may be detected by one or more sensors of a data storage device, in accordance with one or more embodiments. As discussed above, one or more sensor devices of the data storage device may detect a set of tap inputs (e.g., taps, knocks, etc.) on a surface of an enclosure (e.g., housing) of the data storage device. The data storage device (e.g., the controller) may determine whether the set of tap inputs (detected by one or more sensor devices) are valid and may allow access to the data storage device (e.g., to non-volatile memory of the data storage device) when the tap inputs are valid.

Graph 410 may illustrate the data collected by the one or more sensors of the data storage device over a period of time. The X-axis of the graph represents time going from time 0 to T. The Y-axis of the graph may represents the amount of vibration detected by the one or more sensors. For example, the Y-axis of the graph may indicate the magnitude, pressure, force, etc., of a tap input. The amount of vibration may range from 0 to V. As illustrated in FIG. 4B, the data (e.g., sensor data collected by the one or more sensors) indicates that five taps (e.g., taps 411, 412, 413, 414, and 415) were detected on the surface of the enclosure. Taps 411 and 413 have a higher pressure (e.g., were harder taps) and taps 412, 414, and 415 have a lower pressure (e.g., were softer taps).

In one embodiment, the data storage device may determine whether the pressures (e.g., force, magnitude, etc.) of the taps is valid. If the pressures of the taps match a pressure pattern previously provided by the user (e.g., a password that includes tap inputs and/or pressures for the tap inputs), the data storage device may allow access to the non-volatile storage components of the data storage device. For example, if the pressure pattern previously provided by the user (e.g., the password) was [hard, soft, hard, soft, soft], this would match the pressure pattern illustrated in FIG. 4B (e.g., the set of pressures would be valid) and the user would be allowed to access the non-volatile storage components of the data storage device. If the pressures of the taps do not match a pressure pattern previously provided by the user, the data storage device may refrain from allowing and/or may prevent access to the non-volatile storage components of the data storage device. For example, if the pressure pattern previously provided by the user (e.g., the password) was as [hard, hard, hard, soft, hard], this would not match the pressures illustrated in FIG. 4B (e.g., the set of pressures would be invalid) and the user would be allowed to access the non-volatile storage components of the data storage device.

In some embodiments, the data storage device may determine whether the pressures of the taps are valid and whether the timing pattern of the taps is valid, before allowing access to the data storage device (e.g., before allowing access to the memory/non-volatile storage components). For example, if both the pressures and timing patterns of the taps are valid, the data storage device may allow access to the non-volatile storage components. In another example, if either one of the pressures or the timing pattern is invalid, the data storage device may prevent or refrain from allowing access to the non-volatile storage components.

Figure 5A:
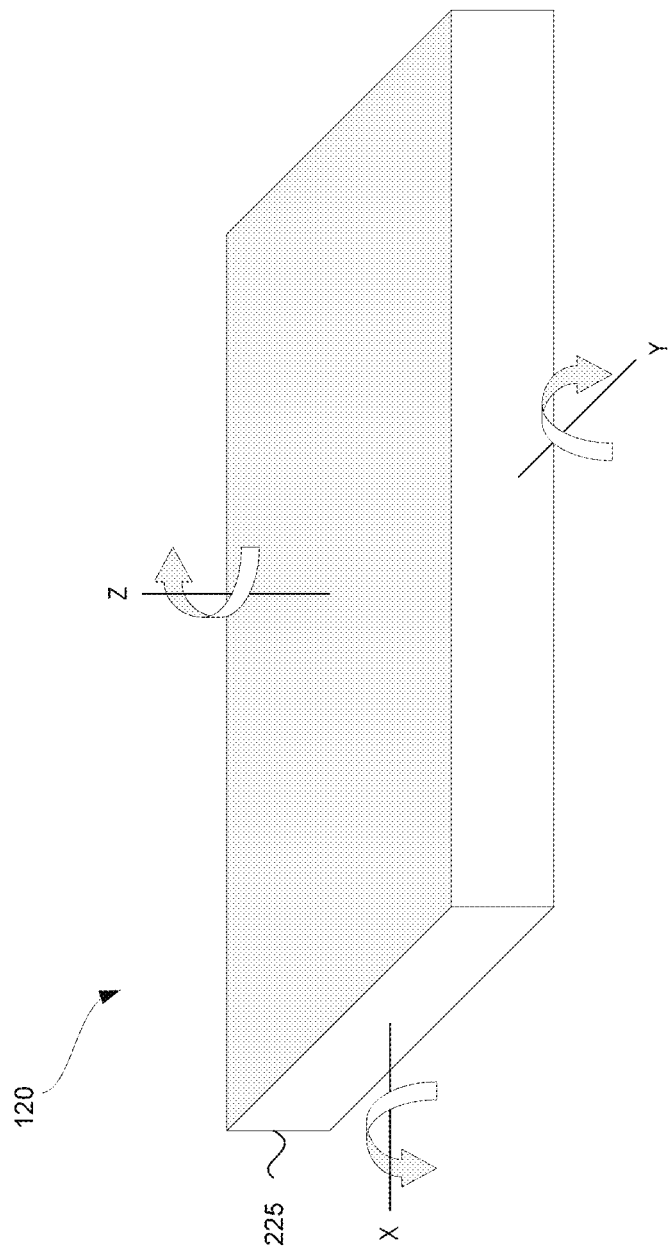
FIG. 5A is a diagram illustrating a data storage device, according to one or more embodiments.

FIG. 5A is a diagram illustrating a data storage device 120, according to one or more embodiments. The data storage device 120 includes a controller (not illustrated in FIG. 3), a network access interface (e not illustrated in FIG. 3), a direct access interface (not illustrated in FIG. 3), non-volatile storage components (not illustrated in FIG. 3), one or more sensor devices (not illustrated in FIG. 3), and an enclosure 225 (e.g., a housing, a casing, etc.), as discussed above. The controller may provide overall control for the data storage device 120, as discussed above. In one embodiment, the data storage device 120 may be an external standalone data storage device (e.g., a NAS device/drive, a DAS device/drive, etc.). In another embodiment, the data storage device 120 may be a portable data storage device, as discussed above. For example, the data storage device 120 may be a portable external hard drive. The portable external hard drive may receive power from a computing device (e.g., a host system) via a connection cable and the direct-access interface 341. The portable external hard drive may also have an internal power source (e.g., a battery located within the enclosures 225), as discussed above. As discussed above, the data storage device (e.g., the controller) may determine whether a set of motions of the data storage device 120 (detected by one or more sensor devices) are valid and may allow access to the data storage device 120 (e.g., to non-volatile memory of the data storage device 120) when the tap inputs are valid.

In one embodiment, the data storage device 120 may determine whether the set of motions are valid by determining whether a set of changes in orientation (of the data storage device 120) are valid. As illustrated in FIG. 3, the data storage device 120 has an X-axis, a Y-axis, and a Z-axis. A user may change the orientation of the data storage device 120 by twisting the data storage device 120 about/around the different axes, as illustrated by the curved arrows. The data storage device 120 may determine whether a pattern of twists/changes in orientation (e.g., a pattern of the twists) are valid. For example a set of motions (e.g., a valid set of twists/changes in orientation) performed by the user may be as follows: 1) a clockwise twist about the X-axis; 2) followed by a clockwise twist about the Y-axis; 3) followed by a counter-clockwise twist about the Z-axis; 4) followed by a clockwise twist about the Z-axis. The data storage device may determine whether the set of motions (e.g., twists or changes in orientation) matches another set of motions previously provided by the user (e.g., a password). For example, the data storage device 120 may determine whether the data storage device 120 is twisted about the same axes, in the same direction, and/or in the same order as the previous set of motions (e.g., the password). If the data storage device 120 is twisted about the same axes, in the same direction, and/or in the same order as the previous set of motions (e.g., the set of changes in orientation is valid), the data storage device 120 may allow access to the non-volatile storage components of the data storage device 120. If the data storage device 120 is not twisted about the same axes, in the same direction, and/or in the same order as the previous set of motions (e.g., the set of changes in orientation is not valid), the data storage device 120 may allow access to the non-volatile storage components of the data storage device 120.

In one embodiment, the data storage device 120 may also determine whether a timing pattern of the set of motions (pauses in between the twists) follow a timing pattern (similar to the timing pattern discussed above in conjunction with FIG. 4A). For example, the data storage device 120 may determine whether the timing between twists (e.g., pauses between the twists) matches the timing in the previous set of twists provided by the user.

FIG. 5B is a diagram illustrating a data storage device 120, according to one or more embodiments. The data storage device 120 includes a controller (not illustrated in FIG. 3), a network access interface (e not illustrated in FIG. 3), a direct access interface (not illustrated in FIG. 3), non-volatile storage components (not illustrated in FIG. 3), one or more sensor devices (not illustrated in FIG. 3), and an enclosure 225 (e.g., a housing, a casing, etc.), as discussed above. The controller may provide overall control for the data storage device 120, as discussed above. In one embodiment, the data storage device 120 may be an external standalone data storage device (e.g., a NAS device/drive, a DAS device/drive, etc.). In another embodiment, the data storage device 120 may be a portable data storage device, as discussed above. For example, the data storage device 120 may be a portable external hard drive. The portable external hard drive may receive power from a computing device (e.g., a host system) via a connection cable and the direct-access interface 341. The portable external hard drive may also have an internal power source (e.g., a battery located within the enclosures 225), as discussed above. As discussed above, the data storage device (e.g., the controller) may determine whether a set of motions of the data storage device 120 (detected by one or more sensor devices) are valid and may allow access to the data storage device 120 (e.g., to non-volatile memory of the data storage device 120) when the tap inputs are valid.

In one embodiment, the data storage device 120 may determine whether the set of motions of the data storage device are valid by determining whether through a 3-dimensional (3-D) space/area are valid. A user may hold the data storage device 120 and may wave, swing, move, shake, etc., the data storage device 120 around in a 3-D space/area (e.g., may wave, swing, move, shake, etc., the data storage device 120 around in the air). For example, as illustrated in FIG. 5B, the user may wave the storage device upward (or may wave the data storage device 120 down, left, or right). In another example, the user may wave data storage device 120 in the air in a figure eight shape. In a further example, the user may move the data storage device 120 in the air to form shapes, letters, numbers, etc. The data storage device 120 may determine whether the movements of the data storage device 120 are valid. For example a set of motions (e.g., a set of movements through the air or a 3-D area/space) performed by the user may be as follows: 1) waving the data storage device 120 up; 2) followed by a waving the data storage device 120 to the right; 3) followed by waving the data storage device 120 down. The data storage device may determine whether the set of movements (movements through the air, movements through a 3-D space/area, etc.) matches another set of movements previously provided by the user (e.g., a password). For example, the data storage device 120 may determine whether the data storage device 120 is moved around to form a figure eight shape. If the set of movements (of the data storage device 120) is in the same order as the previous set of movements (e.g., the set of movements/motion is valid), the data storage device 120 may allow access to the non-volatile storage components of the data storage device 120. If the set of movements (of the data storage device 120) is not in the same order as the previous set of movements (e.g., the set of movements/motion is invalid), the data storage device 120 may allow access to the non-volatile storage components of the data storage device 120.

In one embodiment, the data storage device 120 may also determine whether a timing pattern of the set of motions (pauses in between the individual motions in the set of motions) matches a timing pattern (similar to the timing pattern discussed above in conjunction with FIG. 4A). For example, the data storage device 120 may determine whether the timing between movements (e.g., pauses between the movements) is the same as the timing in the previous set of movements provided by the user.

In some embodiments, the data storage device may determine whether the speeds of the motions are valid and whether the timing pattern of the motions is valid, before allowing access to the data storage device (e.g., before allowing access to the memory/non-volatile storage components). For example, if both the speeds and timing patterns of the motions are valid, the data storage device may allow access to the non-volatile storage components. In another example, if either one of the speeds or the timing pattern is invalid, the data storage device may prevent or refrain from allowing access to the non-volatile storage components.

Figure 6:
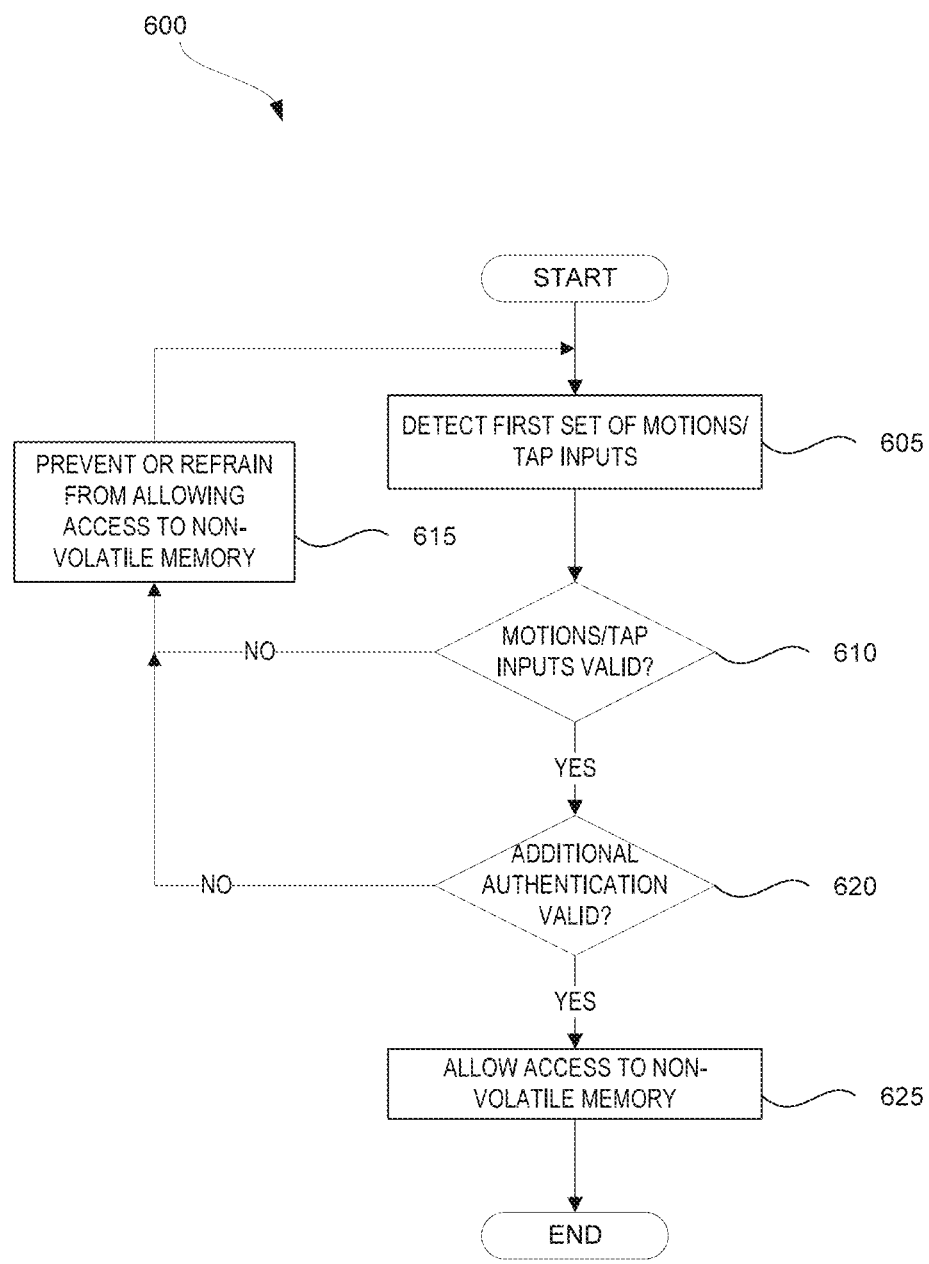
FIG. 6 is a flow diagram illustrating a process for providing secure access to a data storage device, according to an embodiment.

FIG. 6 is a flow diagram illustrating a process 600 for providing secure access to a data storage device, according to an embodiment. The process 600 may be performed by a controller, modules of a controller (e.g., a sensor module, a password module, an encryption module, an access module, etc.) and/or a data storage device, as illustrated and discussed above in conjunction with FIG. 2. The controller (and/or the modules of the controller) may be processing logic that includes hardware (e.g., circuitry, dedicated logic, programmable logic, microcode, etc.), software (e.g., instructions run on a processor), firmware, or a combination thereof.

The process 600 begins at block 605 where the process 600 detects a first set of motions and/or a first set of tap inputs, as discussed above. For example, one or more sensors may detect tap inputs (e.g., knocks, taps, etc.) on an enclosure of the data storage device, as discussed above. In another example, one or more sensors may detect motions of the data storage device, as discussed above. At block 610, the process 600 determines whether the first set of motions and/or the first set of tap inputs is valid, as discussed above. For example, the process 600 may determine whether a timing pattern of the tap inputs are valid, as discussed above. In another example, the process 600 may determine whether the first set of taps are at a set of locations (e.g., are at a set of valid locations) on the enclosure of the data storage device, as discussed above. In a further example, the process 600 may determine whether a set of movements of the data storage device through a 3-D area/space (e.g., movement of the data storage device through the air) are valid, as discussed above.

If the first set of motions and/or the first set of tap inputs are invalid, the process 600 may prevent access to the non-volatile memory of the data storage device at block 615, as discussed above. For example, the process 600 may refrain from decrypting data in the non-volatile memory or may prevent data from being communicated via a direct-access interface and/or a network-access interface. If the first set of motions and/or the first set of tap inputs are valid, the process 600 may optionally perform additional authentication at block 620 (as discussed above and as illustrated in FIGS. 7 and 8). For example, the process 600 may determine whether a location of the data storage device is valid, as discussed above. In another example, the process 600 may determine whether a second set of motions and/or a second set of tap inputs is valid, based on a one-time password, as discussed above. In some embodiments, block 620 may be optional and the process 600 may proceed to block 625 directly if the first set of motions and/or the first set of tap inputs are valid. If the additional authentication is not valid, the process 600 may prevent access to the non-volatile memory of the data storage device at block 615, as discussed above. If the additional authentication is valid, the process 600 may allow access to the non-volatile memory at block 620. For example, the process 600 may decrypt data stored on the non-volatile memory based on the encryption key. In some embodiments, the process 600 may optionally allow access to a first portion of the non-volatile memory (e.g., to a first partition, a first set of file/folders, etc.) at block 625. For example, different users may use the data storage device, as discussed above. The process 600 may allow different users access to different portions of the non-volatile memory based on sets of motions/tap inputs (as discussed above).

Figure 7:
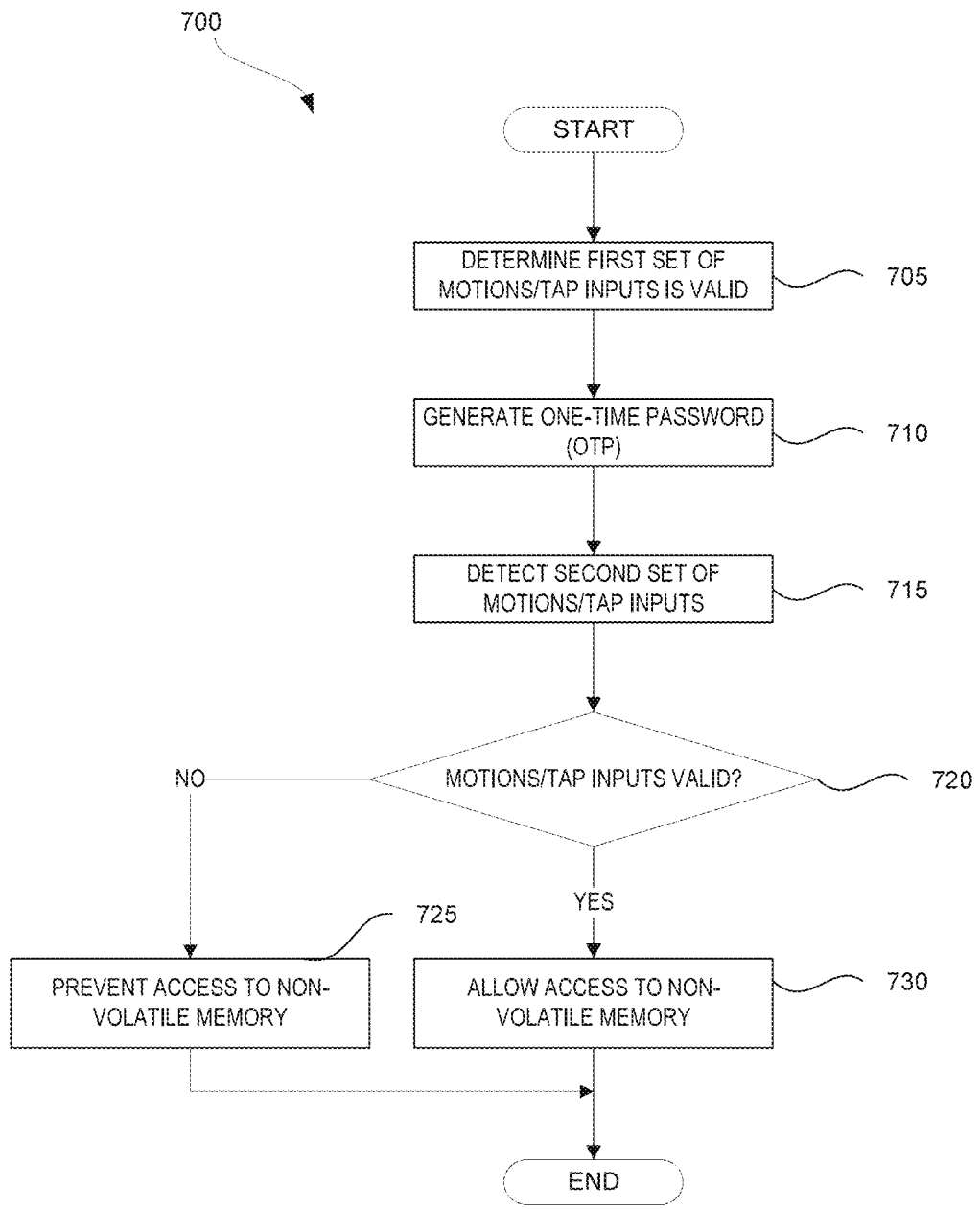
FIG. 7 is a flow diagram illustrating a process for providing secure access to a data storage device, according to an embodiment.

FIG. 7 is a flow diagram illustrating a process 700 for providing secure access to a data storage device, according to an embodiment. The process 700 may be performed by a controller, modules of a controller (e.g., a sensor module, a password module, an encryption module, an access module, etc.) and/or a data storage device, as illustrated and discussed above in conjunction with FIG. 2. The controller (and/or the modules of the controller) may be processing logic that includes hardware (e.g., circuitry, dedicated logic, programmable logic, microcode, etc.), software (e.g., instructions run on a processor), firmware, or a combination thereof.

In some embodiments, the process 700 may be performed to determine whether additional authentication/validation (e.g., an additional password, additional motions, additional tap inputs, etc.) is valid, as discussed above in block 620 of FIG. 6. The process 700 begins at block 705 where the process 700 determines that a first set of motions and/or a first set of tap inputs is valid (as discussed above). At block 710, the process 700 may generate a one-time password (OTP). For example, the process 700 may generate a time-based OTP (e.g., an OTP that is changed after a period of time elapses), as discussed above. In another example, the process 700 may generate an HMAC-based OTP. The OTP may indicate an additional set of taps and/or an additional set of motions that should be performed by a user, as discussed above. At block 715, the process may detect a second set of motions and/or a second set of tap inputs, as discussed above. For example, one or more sensors may detect tap inputs (e.g., knocks, taps, etc.) on an enclosure of the data storage device, as discussed above. In another example, one or more sensors may detect motions of the data storage device, as discussed above.

At block 720, the process 700 determines whether the second set of motions and/or the second set of tap inputs is valid, as discussed above. For example, the process 700 may determine whether the second set of tap inputs are located at certain locations of the enclosure of the data storage device, as discussed above. In a further example, the process 700 may determine whether a set of twists/changes in orientation of the data storage device are valid, as discussed above. If the second set of motions and/or the second set of tap inputs is not valid, the process 700 may prevent access to the non-volatile memory of the data storage device at block 725, as discussed above. For example, the process 700 may not decrypt the data that is stored on the data storage device, as discussed above. If the second set of motions and/or the second set of tap inputs is valid, the process 700 may allow access to the non-volatile memory at block 730, as discussed above. For example, the process 700 may allow data to be communicated via a direct-access interface and/or a network-access interface, as discussed above.

Figure 8:
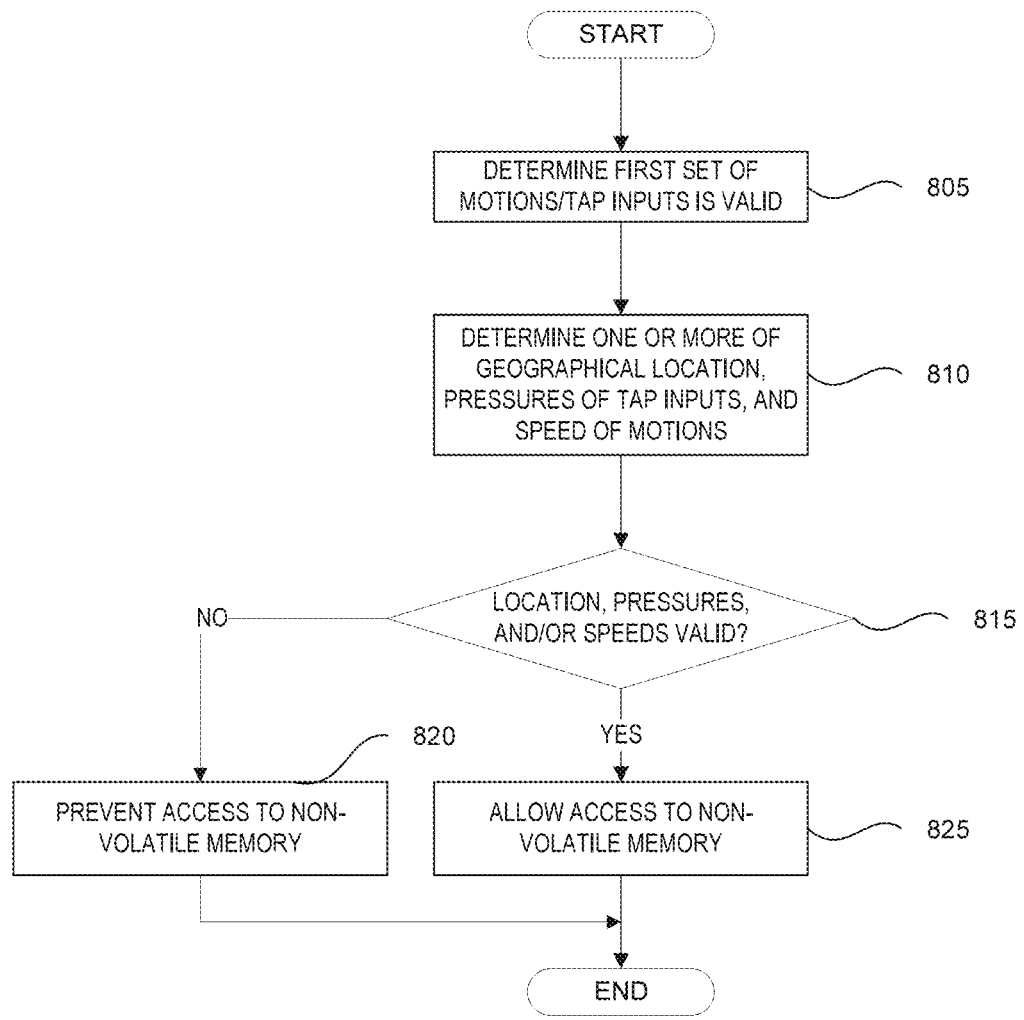
FIG. 8 is a flow diagram illustrating a process for providing secure access to a data storage device, according to an embodiment.

FIG. 8 is a flow diagram illustrating a process 800 for providing secure access to a data storage device, according to an embodiment. The process 800 may be performed by a controller, modules of a controller (e.g., a sensor module, a password module, an encryption module, an access module, etc.) and/or a data storage device, as illustrated and discussed above in conjunction with FIG. 2. The controller (and/or the modules of the controller) may be processing logic that includes hardware (e.g., circuitry, dedicated logic, programmable logic, microcode, etc.), software (e.g., instructions run on a processor), firmware, or a combination thereof.

In some embodiments, the process 800 may be performed to determine whether additional authentication/validation (e.g., an additional password, additional motions, additional tap inputs, etc.) is valid, as discussed above in block 620 of FIG. 6. The process 800 begins at block 805 where the process 800 determines that a first set of motions and/or a first set of tap inputs is valid (as discussed above). At block 810, the process 800 may determine one or more of the geographical location of the data storage device (e.g., GPS coordinates), pressures (e.g., force, magnitude, etc.) of the first set of tap inputs, and the speed of the first set of motions, as discussed above. At block 815, the process determines whether the geographical location of the data storage device, the pressures of the tap inputs, and the speeds of the motions are valid, as discussed above. If the geographical location of the data storage device, the pressures of the tap inputs, and the speeds of the motions are valid, the process 800 may allow access to the non-volatile memory of the data storage device at block 825, as discussed above. If one or more of the geographical location of the data storage device, the pressures of the tap inputs, and the speeds of the motions are not valid, the process 800 may prevent access to the non-volatile memory of the data storage device at block 820, as discussed above.

Figure 9:
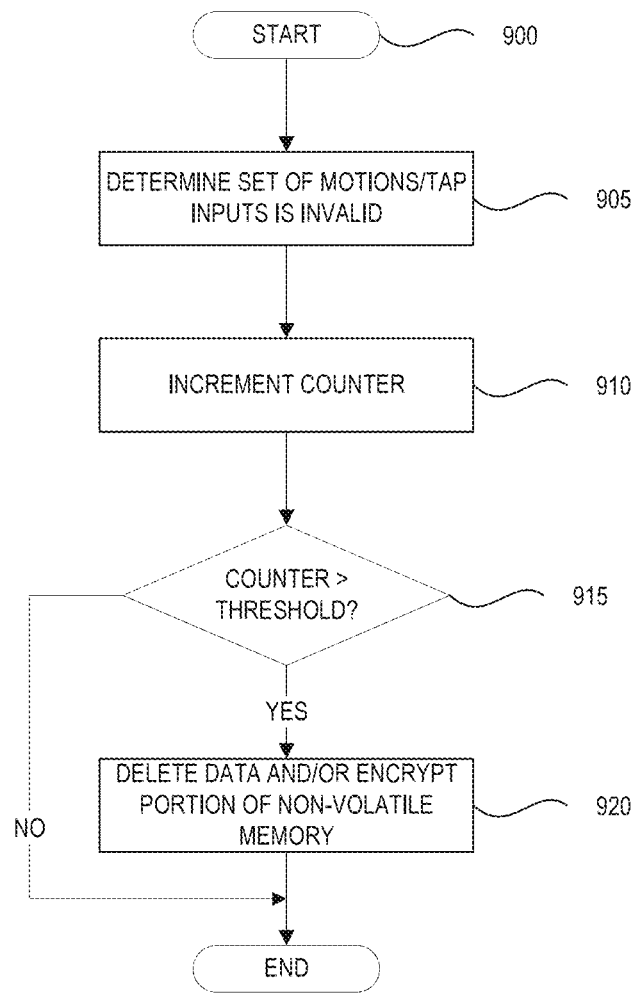
FIG. 9 is a flow diagram illustrating a process for providing secure access to a data storage device, according to an embodiment.

FIG. 9 is a flow diagram illustrating a process 900 for providing secure access to a data storage device, according to an embodiment. The process 900 may be performed by a controller, modules of a controller (e.g., a sensor module, a password module, an encryption module, an access module, etc.) and/or a data storage device, as illustrated and discussed above in conjunction with FIG. 2. The controller (and/or the modules of the controller) may be processing logic that includes hardware (e.g., circuitry, dedicated logic, programmable logic, microcode, etc.), software (e.g., instructions run on a processor), firmware, or a combination thereof.

The process 900 begins at block 905 where the process 900 where the process 900 determines that a set of tap inputs and/or a set of motions provided by the user are invalid. The process 900 increments a counter at block 910. The counter may be used to track the number of times invalid taps/motions have been detected, as discussed above. At block 915, the process 900 determines whether the counter is greater than a threshold. If the counter is greater than a threshold, the process 900 may delete data stored on the non-volatile memory and/or may encrypt a portion of the non-volatile memory. For example, the process 900 may write random data in/over locations in a non-volatile storage memory multiple times to delete the data stored in the locations. In another example, the process 900 may encrypt the data stored in locations of the non-volatile memory with random encryption keys and may delete the random encryption keys to prevent the data stored in the locations from being accessed. This may allow the process 900 to protect the data stored on the non-volatile memory against unauthorized access. If the counter is not greater than the threshold, the process 900 ends. As discussed above, the counter may be periodically reset (e.g., may be set to 0) and/or may be reset when valid tap/swipe inputs are provided by a user.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A portable external hard drive configured to repurpose an accelerometer sensor or a shock sensor of the portable external hard drive for detecting falls to also validate user inputs without using any input hardware other than the accelerometer sensor or the shock sensor, the portable external hard drive comprising:
   an enclosure;
   a disk drive comprising a head and a media platter;
   an interface configured to removably connect to and receive commands and power from a computing device;
   a set of sensor devices including the accelerometer sensor or the shock sensor, the set of sensor devices located within the enclosure and configured to:
      detect, as a first function, acceleration indicating that the portable external hard drive is falling; and
      detect, as a second function, tap inputs on at least four quadrants of a top surface and a bottom surface of the enclosure without using a trackpad or a touch LCD screen;
   a non-volatile memory located within the enclosure and configured to store data; and
   a controller external to the computing device and coupled to the non-volatile memory and the set of sensor devices, wherein the controller is configured to:
      move the head away from the media platter in response to a potential cause of falling damage detected by the set of sensor devices;
      determine whether a set of tap inputs detected by the set of sensor devices is valid by at least:
         identifying a set of quadrants of the top surface and the bottom surface selected by the set of tap inputs; and
         determining that the set of quadrants matches a previously-stored pattern of quadrants; and
      allow access to read from or write to the non-volatile memory by the removably connected computing device in response to determining that the set of tap inputs is valid.

2. The portable external hard drive of claim 1, wherein determining whether the set of tap inputs is valid further comprises:
   determining whether the set of tap inputs are located at a set of valid locations on the enclosure.

3. The portable external hard drive of claim 1, wherein determining whether the set of tap inputs is valid further comprises:
   determining whether a timing pattern of the set of tap inputs is valid.

4. The portable external hard drive of claim 1, wherein determining whether the set of tap inputs is valid further comprises:
   determining whether the set of tap inputs are located at a set of valid locations on the enclosure; and
   determining whether a timing pattern of the set of tap inputs is valid.

5. The portable external hard drive of claim 1, wherein the controller is further configured to:
   generate a one-time password;
   determine whether a second set of tap inputs detected by the set of sensor devices is valid based on the one-time password; and
   allow access to the non-volatile memory further in response to determining that the second set of tap inputs is valid.

6. The portable external hard drive of claim 1, wherein the controller is further configured to:
   determine whether a second set of tap inputs detected by the computing device is valid; and
   allow access to the non-volatile memory further in response to determining that the second set of tap inputs is valid.

7. The portable external hard drive of claim 1, wherein the controller is further configured to:
   determine a set of differing pressures of the set of tap inputs;
   identify a pattern of higher-pressure inputs and lower-pressure inputs in the set of differing pressures of the set of tap inputs; and
   allow access to the non-volatile memory further based on matching the pattern of higher-pressure inputs and lower-pressure inputs with a previously-stored pressure pattern.

8. The portable external hard drive of claim 1, wherein the controller is configured to allow access to read from or write to the non-volatile memory by:
   decrypting at least a portion of the non-volatile memory.

9. The portable external hard drive of claim 1, wherein:
   the interface comprises a direct-access interface configured to connect to the computing device via a connection cable; and
   the controller is further configured to allow access to read from or write to the non-volatile memory by allowing data to be communicated via the direct-access interface.

10. The portable external hard drive of claim 1, wherein the controller is further configured to:
    prevent access to read from or write to the non-volatile memory in response to determining that the set of tap inputs is invalid.

11. The portable external hard drive of claim 1, wherein the controller is further configured to:
    determine a number of access attempts in response to determining that the set of tap inputs is invalid; and
    delete data stored on the non-volatile memory in response to determining that the number of access attempts exceeds a threshold.

12. The portable external hard drive of claim 1, wherein the controller is further configured to:
    determine a number of access attempts in response to determining that the set of tap inputs is invalid; and
    encrypt at least a portion of the non-volatile memory in response to determining that the number of access attempts exceeds a threshold.

13. The portable external hard drive of claim 1, wherein the controller is further configured to:
  determine whether a second set of tap inputs detected by the set of sensor devices is valid; and
  allow access to the non-volatile memory further in response to determining that the second set of tap inputs is valid.

14. The portable external hard drive of claim 13, wherein the controller is further configured to:
  allow access to read from or write to a first portion of the non-volatile memory in response to determining that the set of tap inputs is valid; and
  allow access to read from or write to a second portion of the non-volatile memory in response to determining that the second set of tap inputs is valid.

15. The portable external hard drive of claim 1, wherein the portable external hard drive lacks a touch-sensitive input device.

16. A method for validation using a portable external hard drive comprising a disk drive having a head and a media platter, and a set of sensor devices including an accelerometer sensor or a shock sensor, the portable external hard drive configured to repurpose the accelerometer sensor or the shock sensor to validate user inputs without using any input hardware other than the accelerometer sensor or the shock sensor, the method comprising:
  detecting, as a first function of the set of sensor devices, acceleration indicating that the disk drive is falling;
  causing the head to move away from the media platter in response to the detected acceleration;
  detecting without using a trackpad or a touch LCD screen, as a second function of the set of sensor devices, a set of tap inputs on at least four quadrants of a top surface and a bottom surface of an enclosure of a portable external disk drive comprising the disk drive;
  determining whether the set of tap inputs is valid by at least:
    identifying a set of quadrants of the top surface and the bottom surface selected by the set of tap inputs; and
    determining that the set of quadrants matches a previously-stored pattern of quadrants; and
  allowing access to read from or write to a non-volatile memory of the portable external disk drive by a computing device in response to determining that the set of tap inputs is valid, the computing device removably coupled to the portable external disk drive by a connection cable;
  wherein the first function and the second function are performed by the accelerometer sensor or the shock sensor of the set of sensor devices.

17. The method of claim 16, wherein determining whether the set of tap inputs is valid further comprises:
  determining whether the set of tap inputs are located at a set of valid locations on the enclosure.

18. The method of claim 16, wherein determining whether the set of tap inputs is valid further comprises:
  determining whether a timing pattern of the set of tap inputs is valid.

19. The method of claim 16, wherein determining whether the set of tap inputs is valid further comprises:
  determining whether the set of tap inputs are located at a set of valid locations on the enclosure; and
  determining whether a timing pattern of the set of tap inputs is valid.

20. The method of claim 16, further comprising:
  generating a one-time password;
  determining whether a second set of tap inputs is valid based on the one-time password; and
  allowing access to the non-volatile memory further in response to determining that the second set of tap inputs is valid.

21. The method of claim 16, further comprising:
  determining whether a second set of tap inputs detected by the computing device is valid; and
  allowing access to the non-volatile memory further in response to determining that the second set of tap inputs is valid.

22. The method of claim 16, further comprising:
  determining a set of differing pressures of the set of tap inputs;
  identifying a pattern of higher-pressure inputs and lower-pressure inputs in the set of differing pressures of the set of tap inputs; and
  allowing access to the non-volatile memory further based on matching the pattern of higher-pressure inputs and lower-pressure inputs with a previously-stored pressure pattern.

23. The method of claim 16, wherein allowing access to read from or write to the non-volatile memory comprises:
  decrypting at least a portion of the non-volatile memory.

24. The method of claim 16, wherein allowing access to read from or write to the non-volatile memory comprises:
  allowing data to be communicated via a direct-access interface of the portable external hard drive.

25. The method of claim 16, further comprising:
  preventing access to read from or write to the non-volatile memory in response to determining that the set of tap inputs is invalid.

26. A portable external hard drive configured to repurpose an accelerometer sensor or a shock sensor of the hard drive to validate user inputs without using any input hardware other than the accelerometer sensor or the shock sensor, the hard drive comprising:
  an enclosure;
  a disk drive comprising a head and a media platter;
  an interface configured to physically connect to and receive commands from a computing device;
  means for detecting tap inputs on a surface of one side of the enclosure, the means for detecting tap inputs located within the enclosure, the means for detecting tap inputs including the accelerometer sensor and the shock sensor, the means for detecting tap inputs configured to:
    detect, as a first function, acceleration indicating that the disk drive is falling;
    cause the head to move away from the media platter in response to the detected acceleration; and
    detect, as a second function, tap inputs on at least four quadrants of a top surface and a bottom surface of the enclosure without using a trackpad or a touch LCD screen;
  means for storing data;
  means for determining whether a set of tap inputs detected by the means for detecting tap inputs is valid by at least:
    identifying a set of quadrants of the top surface and the bottom surface selected by the set of tap inputs; and
    determining that the set of quadrants matches a previously-stored pattern of quadrants; and
  means for allowing access to the means for storing data in response to determining that the set of tap inputs is valid.

* * * * *